(12) United States Patent
Iwade et al.

(10) Patent No.: US 6,900,804 B1
(45) Date of Patent: May 31, 2005

(54) METHOD OF FORMING POLYGON IMAGE AND IMAGE PROCESSING APPARATUS USING THE SAME

(75) Inventors: Takashi Iwade, Tokyo (JP); Ryuuta Ueda, Tokyo (JP); Takashi Ando, Tokyo (JP)

(73) Assignee: Sega Enterprises, Ltd. (JP)

( * ) Notice: Subject to any disclaimer, the term of this patent is extended or adjusted under 35 U.S.C. 154(b) by 394 days.

(21) Appl. No.: 09/664,435

(22) Filed: Sep. 18, 2000

(30) Foreign Application Priority Data

Sep. 16, 1999 (JP) .......................................... 11-262699

(51) Int. Cl.⁷ ........................... G06T 15/50; G09G 5/00
(52) U.S. Cl. ....................................... 345/426; 345/582
(58) Field of Search ................................ 345/472, 426, 345/423, 428, 619, 611

(56) References Cited

U.S. PATENT DOCUMENTS

| | | | | |
|---|---|---|---|---|
| 3,889,107 A | * | 6/1975 | Sutherland ................... 345/623 |
| 4,525,858 A | * | 6/1985 | Cline et al. .................. 382/154 |
| 4,819,192 A | * | 4/1989 | Kuragano et al. .......... 345/421 |
| 4,862,391 A | * | 8/1989 | Ohhashi ..................... 345/426 |
| 4,901,064 A | * | 2/1990 | Deering ...................... 345/426 |
| 5,043,922 A | * | 8/1991 | Matsumoto ................. 345/422 |
| 5,083,287 A | * | 1/1992 | Obata et al. ................. 345/426 |
| 5,163,126 A | * | 11/1992 | Einkauf et al. ............. 345/423 |
| 5,193,145 A | * | 3/1993 | Akeley ....................... 345/423 |
| 5,253,335 A | * | 10/1993 | Mochizuki et al. ......... 345/422 |
| 5,253,339 A | * | 10/1993 | Wells et al. ................. 345/426 |
| 5,357,599 A | * | 10/1994 | Luken ......................... 345/627 |
| 5,357,600 A | * | 10/1994 | Shirman et al. ............ 345/520 |
| 5,499,324 A | * | 3/1996 | Nakayama .................. 345/610 |
| 5,544,291 A | * | 8/1996 | Gilley et al. ................ 345/423 |
| 5,544,294 A | * | 8/1996 | Cho et al. ................... 345/441 |
| 5,546,515 A | * | 8/1996 | Mochizuki .................. 345/606 |
| 5,572,635 A | * | 11/1996 | Takizawa et al. ........... 345/426 |
| 5,592,598 A | * | 1/1997 | Yamrom ...................... 345/423 |
| 5,613,050 A | * | 3/1997 | Hochmuth et al. ......... 345/422 |
| 5,706,415 A | * | 1/1998 | Kelley et al. ............... 345/426 |
| 5,745,666 A | * | 4/1998 | Gilley et al. ................ 345/428 |
| 5,777,620 A | * | 7/1998 | Billyard ...................... 345/426 |
| 5,912,671 A | * | 6/1999 | Oka ............................ 345/427 |
| 6,034,691 A | * | 3/2000 | Aono et al. ................. 345/582 |
| 6,040,835 A | * | 3/2000 | Gibson ....................... 345/424 |
| 6,163,319 A | * | 12/2000 | Peercy et al. ............... 345/426 |
| 6,246,414 B1 | * | 6/2001 | Kawasaki ................... 345/419 |
| 6,333,742 B1 | * | 12/2001 | Morioka et al. ............ 345/426 |
| 6,339,433 B1 | * | 1/2002 | Politis et al. ................ 345/646 |
| 6,356,264 B1 | * | 3/2002 | Yasui et al. ................. 345/426 |
| 6,441,819 B1 | * | 8/2002 | Suzuoki ...................... 345/423 |
| 6,476,809 B1 | * | 11/2002 | Browne ...................... 345/423 |
| 6,489,955 B1 | * | 12/2002 | Newhall, Jr. ................ 345/419 |
| 6,504,538 B1 | * | 1/2003 | Freund et al. .............. 345/426 |
| 6,515,674 B1 | * | 2/2003 | Gelb et al. .................. 345/582 |
| 6,525,740 B1 | * | 2/2003 | Cosman ...................... 345/584 |

(Continued)

*Primary Examiner*—Michael Razavi
*Assistant Examiner*—Ryan Yang
(74) *Attorney, Agent, or Firm*—Dickstein Shapiro Morin & Oshinsky LLP

(57) ABSTRACT

This method of forming a polygon image comprises the steps of obtaining a plurality of polygons having normal line data as apex data and constituting a model; sorting the model constituted by the plurality of polygons into polygons of a first color part and polygons of a second color part by boundary lines consisting of the direction of a light source and normal lines of the model; pasting up a first mono-color texture on the sorted polygons having the first color part, and pasting up a second mono-color texture on the sorted polygons having the second color part; and dividing the polygons intersecting the boundary lines along the boundary lines, pasting up the first mono-color texture on the polygons belonging to the first color part out of the divided polygons, and pasting up the second mono-color texture on the polygons belonging to the second color part.

9 Claims, 6 Drawing Sheets

U.S. PATENT DOCUMENTS

| | | | |
|---|---|---|---|
| 6,529,194 B1 * | 3/2003 | Yamaguchi | 345/426 |
| 6,535,219 B1 * | 3/2003 | Marshall et al. | 345/581 |
| 6,545,677 B2 * | 4/2003 | Brown | 345/426 |
| 6,549,202 B1 * | 4/2003 | Hasegawa et al. | 345/426 |
| 6,774,896 B2 * | 8/2004 | Oka | 345/426 |
| 2001/0045955 A1 * | 11/2001 | Oka | 345/582 |
| 2001/0055028 A1 * | 12/2001 | Oka | 345/629 |
| 2002/0047843 A1 * | 4/2002 | Higashiyama et al. | 345/426 |

* cited by examiner

METHOD OF FORMING POLYGON IMAGE AND IMAGE PROCESSING APPARATUS USING THE SAME

BACKGROUND OF THE INVENTION

1. Field of the Invention

The present invention relates generally to a method of forming a polygon image, and more particularly, to a method of forming an animation image in real time by the polygon image, as well as to an image processing apparatus using the same.

2. Description of the Related Art

In recent years, in order to give the virtual sense for the real by use of a computer graphic (CG) technique with respect to an image processing apparatus by use of a computer such as a gate unit or the like, a development is made for forming an image model (hereinafter merely called a model) which is called a character, an object, or a model of details nearer to the actual, by use of a polygon which has a plurality of polygonal faces.

For this reason, it is general that a texture having each tone is pasted up in a plurality of polygons constituting a model.

That is, in a hardware in a game unit under the present condition, color data are given as apex data to respective apexes of the polygon forming the model. A color of each pixel in the polygon is plotted by the hardware, while the color at the apex is interpolated. Thus, the texture in each polygon can be plotted having a smooth tone. Furthermore, a polygon edge is not marked in a generic model by this method.

On the other hand, it is possible to constitute a reflection by an animation image. A plurality of cell images are continuously projected in the prior art, so that it is public domain that the animation image having a motion can be obtained.

It is desirable in recent years that such the animation image is displayed even in the image processing apparatus using a computer such as a game unit or the like.

For this reason, there is a technique which is called a toon rendering in which a special rendering process is executed by a dedicated three-dimensional process software, thereby simplifying a tone of the texture of the polygon constituting the model, to form a picture similar to an animation picture.

On the other hand, it is difficult to obtain the picture similar to the animation picture by the hardware in the game unit under the present condition without using such the special technique.

That is, as a plotting process is performed by the hardware, while a color of each apex is interpolated, the texture of the polygon is plotted having the tone. Thus, in the polygon to be plotted, the cubic sense is excessively emphasized and the atmosphere as the animation picture is impaired.

SUMMARY OF THE INVENTION

It is therefore the object of the present invention to provide a method of forming an animation image in real time in an image processing apparatus such as a game unit or the like for plotting a model using a plurality of polygons by a generic computer graphic process.

In order to attain the object, according to aspects of the present invention there are provided an animation image forming method and an image processing apparatus using the same, the method comprising the steps of obtaining a plurality of polygons having normal line data as apex data and constituting a model; sorting the model constituted by the plurality of polygons into polygons of a first color part and polygons of a second color part by boundary lines consisting of the direction of a light source and normal lines of the model; pasting up a first mono-color texture on the sorted polygons having the first color part, and pasting up a second mono-color texture on the sorted polygons having the second color part; and dividing the polygons intersecting the boundary lines along the boundary lines, pasting up the first mono-color texture on the polygons belonging to the first color part out of the divided polygons, and pasting up the second mono-color texture on the polygons belonging to the second color part.

Preferably, the sorting by the boundary lines into polygons of the first color portion and polygons of the second color part is implemented by acquiring an inner product value of the normal line of the apexes of the respective polygons and the normal line of the light source, from the direction of the light source and the normal line of the model with respect to the plurality of polygons, and then sorting into polygons having the same polarity of the thus acquired inner product at the respective apexes and polygons having different polarities of the thus acquired inner product at the respective apexes.

Preferably, the intersectional position of the polygon intersecting a boundary line is acquired from a proportional relation with the inner product of each of two apexes of a boundary-line-intersecting side of the polygon intersecting the boundary lines when the inner product value at the intersectional position is 0.

BRIEF DESCRIPTION OF THE DRAWINGS

The above and other objects, aspects, features and advantages of the present invention will become more apparent from the following detailed description when read in conjunction with the accompanying drawings in which.

DESCRIPTION OF THE PREFERRED EMBODIMENTS

Figure 1:
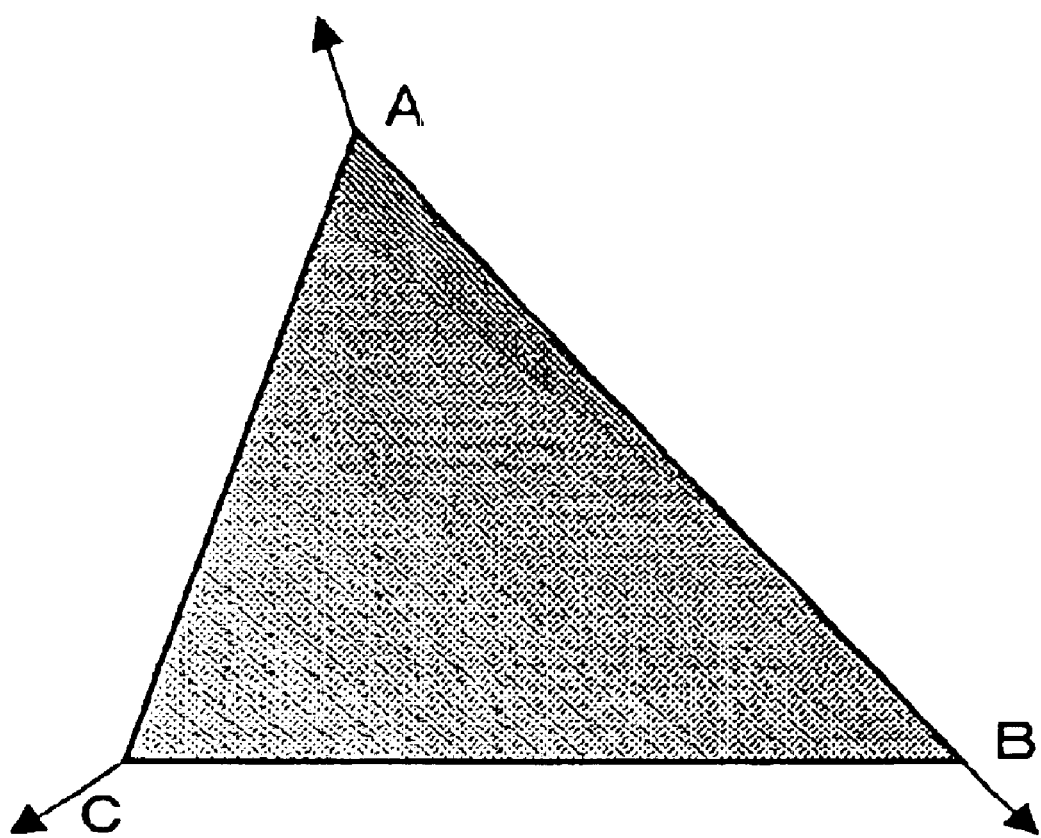
FIG. 1 is a view in which a triangular polygon is plotted, as an example of a polygon constituting a model.

Hereinafter, the embodiments according to the present invention will be explained with reference to the drawings. Incidentally, in the drawings, the same reference numerals or reference symbols are assigned to same or like elements for description.

Here, for understanding of the present invention, plotting of polygons which is performed in an image processing apparatus such as a game unit or the like for plotting a model by use of a plurality of polygons by a generic computer graphic process will be explained.

FIG. 1 is a view plotting a triangular polygon as an example of the polygon constituting a model. Each of three apexes A, B, C of the triangular polygon contains apex coordinates, normal line vectors, texture data and the like as apex data.

The texture data obtained by interpolating the apex data are given to each pixel in the polygons. Accordingly, in the texture pasted up in the polygon, a tone continuously changes as shown in FIG. 1. In the case where the model is constituted by use of the polygon having the tone in this manner, it is hard to attain the atmosphere of an animation as the cubic sense is overemphasized as an animation picture.

Figure 2:
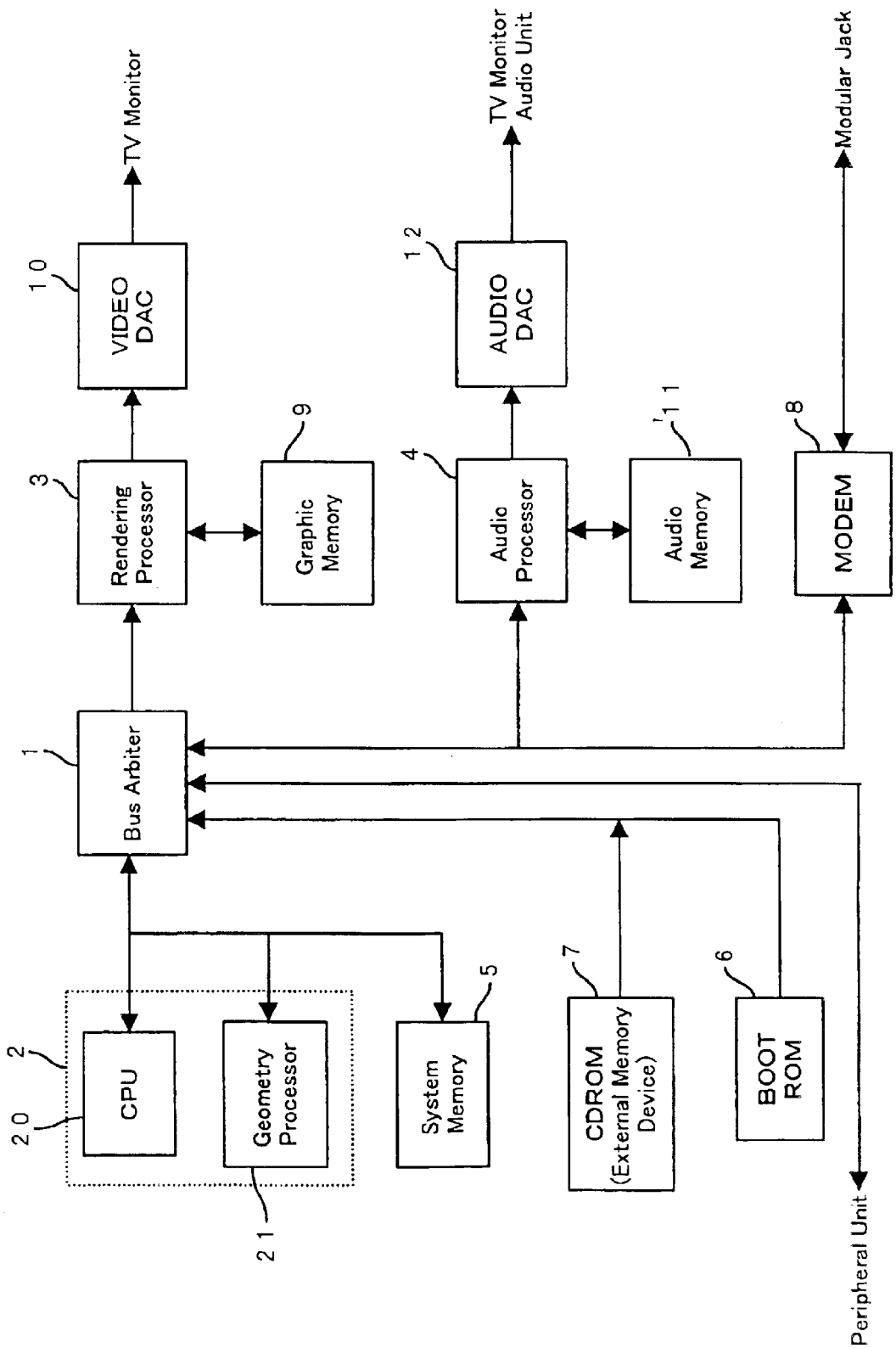
FIG. 2 is a block diagram of a structural example of a game unit which displays a model as images which is constituted by use of the polygon having a tone which continuously changes, as shown in FIG. 1.

FIG. 2 is a block diagram of a structural example of a game unit which displays a model as images which is constituted by use of the polygon having the tone which continuously changes, as shown in FIG. 1. It is characterized in the present invention in that the structure of such the game unit is used, while inconveniences that the cubic sense is overemphasized as the animation picture are dissolved, thereby forming an animation image.

In FIG. 2, a control part 2, a rendering processor 3, and an audio processor 4 are connected to each other through buses in which each bus possession is controlled by a bus arbiter 1. Furthermore, a system memory 5 is connected to a bus connected to the control part 2. Furthermore, the bus arbiter 1 is connected to a boot ROM 6, and an external memory device 7 such as CDROM or the like.

Furthermore, a signal is transmitted to and received from outside the apparatus through a modem 8 as occasion demands. Furthermore, the bus arbiter 1 is connected to a peripheral unit such as an input pad or the like.

The control part 2 has a CPU 20 as control means and a geometry processor 21 for performing a dedicated coordinate transformation process in order to decrease a load of the CPU 20.

The rendering processor 3 for performing a rendering process such as a texture paste or the like is connected to a graphic memory 9 for temporally storing image data. An output of the rendering processor 3 is displayed on a TV monitor (not shown) through a DA transducer 10 for a video signal.

On the other hand, the audio processor 4 is connected to an audio memory 11, and an output of the audio processor 4 is connected to the TV monitor or audio unit (not shown) through a DA transducer 12 for an audio signal.

If the game unit is energized, the CPU 20 reads a game program from the CDROM 7 into the system memory 5 according to a boot program stored in the boot ROM 6.

Accordingly, the CPU 20 inputs polygon data of world coordinates constituting the model showing up in the game program according to the game program read into the system memory 5, and commands coordinates transformation to the geometry processor 21.

The geometry processor 21 transforms the polygon data of the world coordinates to station point coordinates. The polygon data constituting the model transformed into the station point coordinates data are supplied to the rendering processor 3, in which the texture is pasted up on the respective polygons according to the polygon data.

The corresponding texture data are read out based on the polygon data from the texture memory (not shown), and the texture is pasted up on the polygon. Next, the polygon data are transformed into two-dimensional coordinates data in response to a display screen of the monitor, and are stored in the graphic memory 9 as image data.

The image data are repeatedly read out of the graphic memory 9, and are transformed into an analog video signal by the video DA transducer 10, and are displayed on the TV monitor (not shown).

Returning to FIG. 1, the texture is pasted up on the illustrated triangular polygon so as to have a tone according to a position of a light source at each coordinates point in the polygon to be acquired from the polygon data of three apexes, for plotting. A plurality of such polygons are used to form a model.

On the contrary, in the present invention, a mono-color having no tones is pasted up on the polygon, and the model is formed by the plurality of polygons not having such tornal colors.

Figure 3:
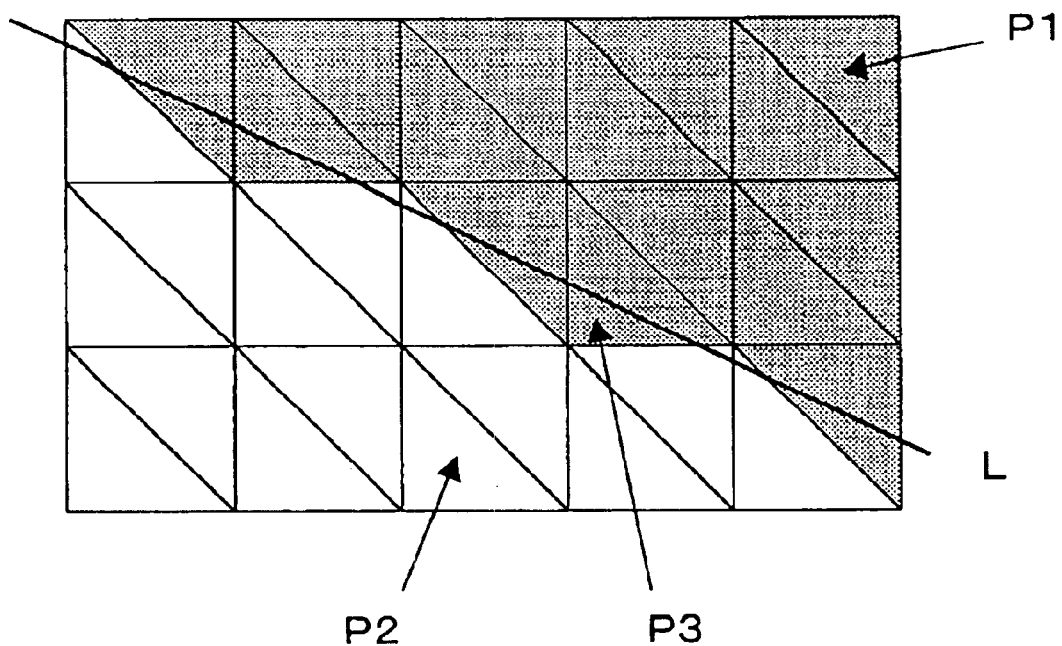
FIG. 3 is a view showing part of the model formed by a plurality of triangular polygons having no tornal colors.

FIG. 3 shows part of the model formed by a plurality of the triangular polygons not having such the tornal colors. On the border of a boundary line L, a polygon having a first color part, for example, a polygon P1, exists on the upside, and a polygon having a second color part, for example, a polygon P2, exists on the downside. Furthermore, the boundary line L passes a polygon having the first color part, or second color part, for example, a polygon P3.

This boundary line L is set, for example, so as to attach a shadow part in the model to be formed by the polygon in response to a position of a light source in a progress of a game.

In FIG. 3, the polygon P1 is a polygon in a shade part, and the polygon P2 is a polygon in a bright part which is not shaded. The boundary line L is a boundary between the bright part and the shadow part, and a polygon crossing the boundary, for example, the polygon P3 can be formed. In FIG. 3, accordingly, a border between the bright part and the dark part is in polygon unit, and the boundary becomes not a linear model picture, but a rugged one.

Figure 4:
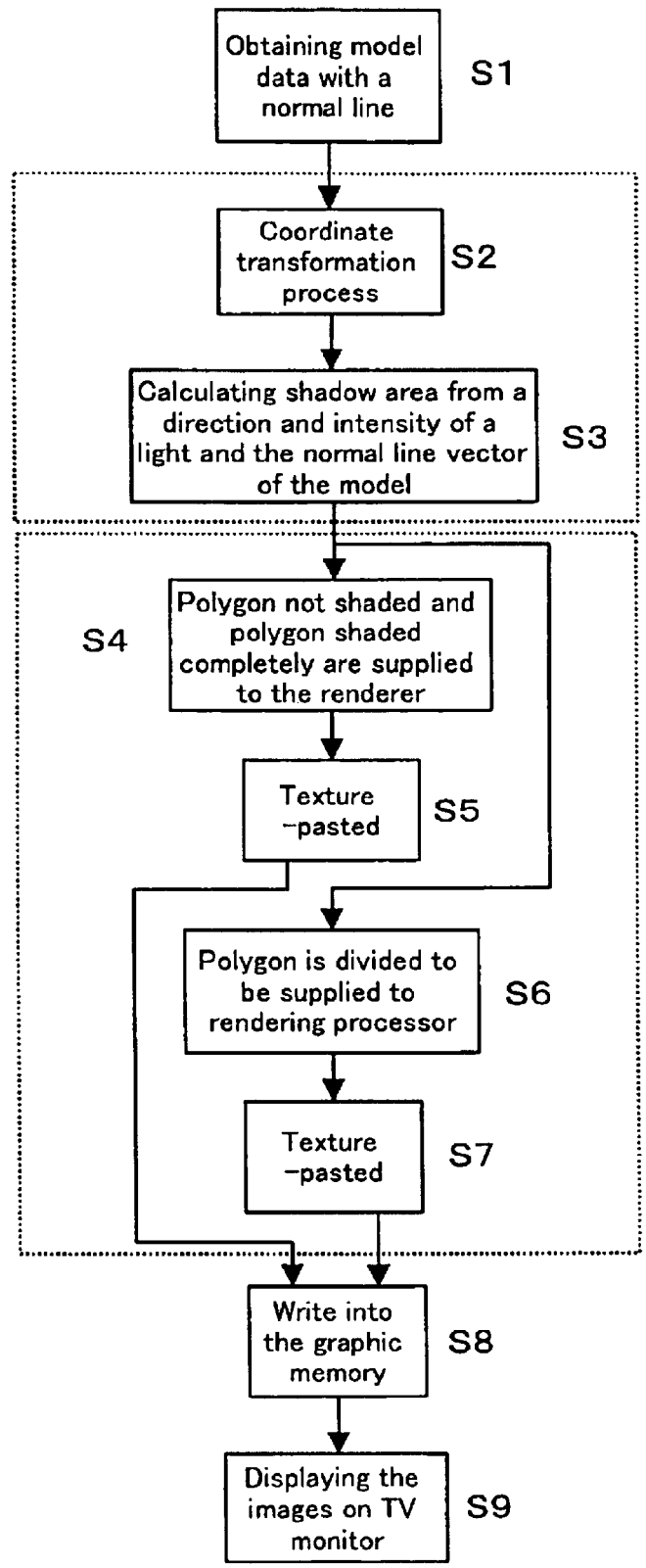
FIG. 4 is a view showing an operating flow according to the present invention, which is practicable in a structure of the game unit of FIG. 2.

The present invention dissolves such inconveniences, and FIG. 4 is an operating flow therefor according to the present invention, and this is practicable in the structure of the game unit of FIG. 2.

Model data with a normal line are obtained from a program read in the system memory 5 by control of the CPU 20 (step S1). These model data have the world coordinates and normal line vectors as the respective apex data.

The model data are transformed into the station point coordinates in the geometry processor 21 (step S2). Then, a shadow area is calculated from a direction and intensity of a light and the normal line vector of the model (step S3)

That is, the calculation of the shadow area is a process for judging for sorting whether or not a polygon is one belonging to the shadow area in each of the plurality of polygons constituting the model.

For judging for sorting whether or not a polygon is one belonging to the shadow area, an inner product of the normal line of each apex and a light source is first of all acquired.

A formula for acquiring an inner product i of the normal line and light source is denoted as follows:

$$i=(ax*lx+ay*ly+az*lz)*\text{intensity}+\text{ambient}$$

Here, ax, ay, az are normal line vectors of the apex, and lx, ly, lz are normal line vectors of a light source.

Furthermore, "intensity" is a diffuse reflection coefficient of a model, and "ambient" is a product of an ambient light intensity and a diffuse reflection coefficient of an ambient light, and a boundary position of the shadow area can be altered by changing these values.

Polarities of all the inner product values i of the apexes constituting the polygon are compared with each other. The polygons are sorted into polygons in which the polarities are all same and polygons in which polarities of the different inner product values i exist.

In the case where the polarities of all the inner product values i at the apexes constituting the polygon are same, the polygon does not intersect the boundary line L as a boundary between the bright part and shadow part.

In the example of FIG. 3, for example, the polygons P1, P2 have the same polarities of all the inner product values i.

Figure 5:
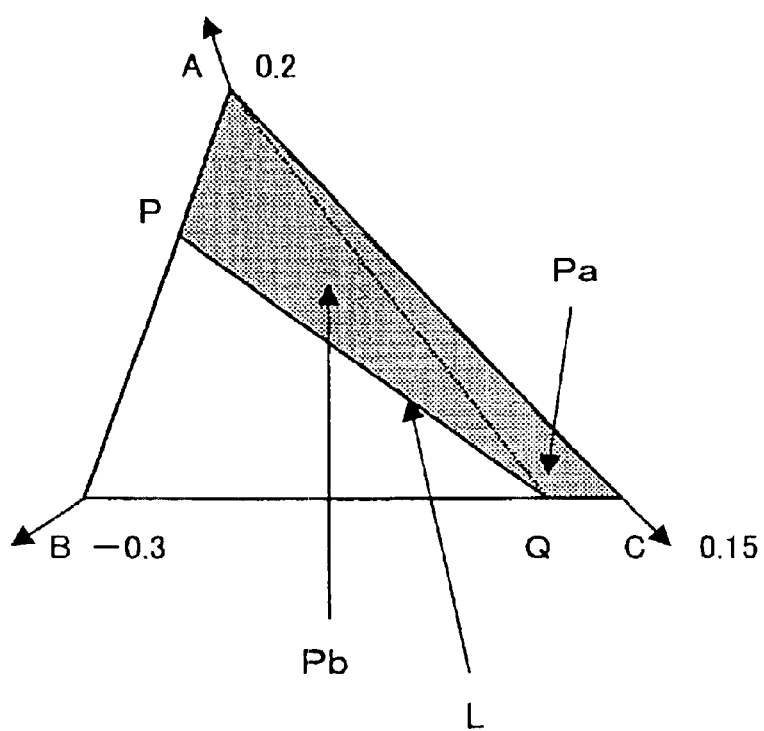
FIG. 5 is an enlarged view of a polygon relevant to a polygon P3 of FIG. 3.

FIG. 5 is an enlarged view of an example of a polygon similar to the polygon P3 of FIG. 3, having the three apexes A, B, C, and it is assumed that the inner product values i of the respective apexes acquired from the aforesaid formula are A=0.2, B=−0.3, and C=0.15. As the polarities of all the inner product values i of the apexes constituting the polygon are not same, the polygon intersects the boundary line L as a boundary between the bright part and shadow part.

In this manner, regarding all the polygons constituting the model, the polarities of the inner product values i between the apexes are compared with each other, and it is judged whether or not the polygon is one having the apexes of the inner product values i having different polarities.

The polygon data of a polygon not having the apexes of the inner product values i having the different polarities, namely a polygon not shaded (for example, in FIG. 3, the polygon P2), and a polygon shaded completely (for example, in FIG. 3, the polygon P1) are supplied to the rendering processor (renderer) 3 of FIG. 2 (step S4).

In the rendering processor 3, by a normal process, the texture data included in the apex data of the supplied polygon data are interpolated with respect to the respective structural pixels, and the corresponding texture of the bright color and dark color are pasted up thereon (step S5).

On the other hand, in step S3, regarding the polygon P3 having the apexes of the inner product values i having the different polarities, namely the polygon having partially a shadow, a crossing position of the boundary line L is further acquired.

Figure 6:
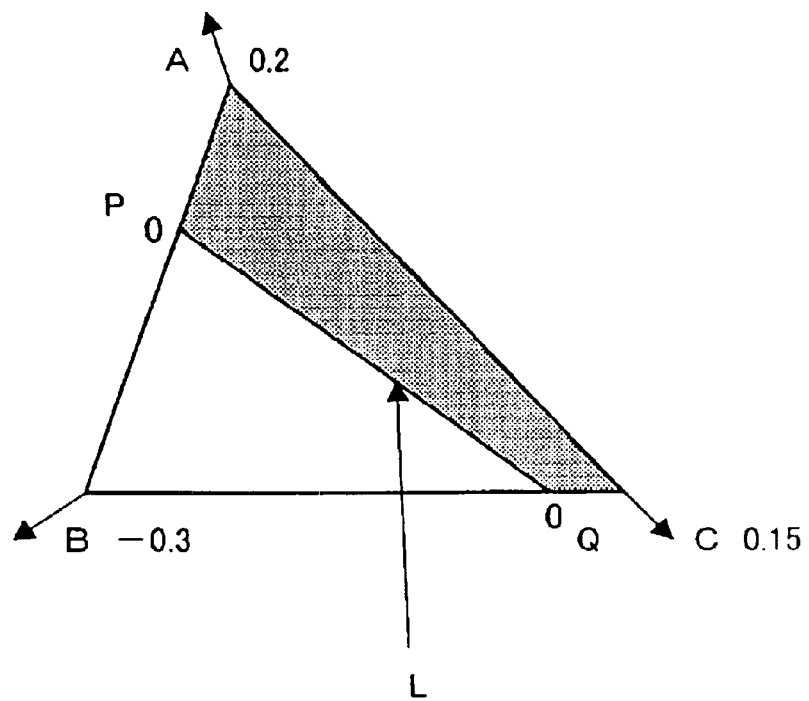
FIG. 6 is a view for explaining an algorithm which acquires a position of a crossing side of a boundary line L.

FIG. 6 is a view for explaining an algorithm which acquires a position of a crossing side of the boundary line L. Comparing the apex A with the apex B, as the polarity of the inner product value i is different, it is judged that the boundary line L intersects a point P of a side which couples the apex A to the apex B. In the same manner, the boundary line L also intersects a point Q of a side which couples the apex B to the apex C. The inner product value i at a position of a side intersecting the boundary line L is 0. Accordingly, the position of the point P can be indicated by a ratio of the inner product values of the apexes A, B as below.

An absolute value of the inner product value of A : An absolute value of the inner product value of B=AP : PB Accordingly, if each component with respect to three-dimensional coordinates x, y, z is divided by this ratio, the coordinates of the point P are acquired. In the same manner, the coordinates of the point Q can be acquired.

Furthermore, as shown in FIG. 5, as an upper region sectioned by the point P and point Q, namely a shaded part, is a tetragonal polygon, in the case where it is set as a triangular polygon in the same manner as in the other polygons, the point A and the point Q are coupled to each other, and it can further be divided into two triangular polygons Pa, Pb.

In this manner, in step S3, the polygon having the apex of the inner product value i having the different polarities is divided, to be supplied to the rendering processor 3 (step s6). Next, the texture of a dark mono-color in the same manner as in the polygon P1 is pasted up on the divided polygon, and simultaneously the polygon belonging to the shaded part, and the texture of a bright mono-color in the same manner as in the polygon P2 is pasted up on the polygon not shaded (step S7).

In the aforesaid manner, in step S5 and step S7, the image data of the polygon on which the texture is pasted up are written into the graphic memory 9 (step S8). The image data are in sequence read out of the graphic memory 9, and are transformed into an analog image signal by the video DA transducer 10, and the images are displayed on the TV monitor (step S9).

In the aforesaid manner, in the embodiments of FIGS. 3 and 5 according to the present invention, the triangular polygon at the apexes A, B, C intersecting the boundary line between the shaded part and bright part is divided into a triangle PBQ and a tetragon APQC (further divided into a triangle APQ and a triangle AQC), and if the former is plotted (texture-pasted) with a bright mono-color and the latter is plotted with a dark mono-color, a region plotted with the dark mono-color can be set as the shaded part.

If all the polygons intersecting the boundary line L are performed such a division process, a model in which they are fully sorted into the shaded part and bright part is plotted in the first color part and second color part, as the embodiment.

Furthermore, the boundary between the first color part and second color part, namely the boundary between the shaded part and bright part (setting of the boundary line L), can be appropriately set in a progress of the program. Even in this case, it is possible to detect the polygon readily intersecting the boundary line L by calculation in real time, and to divide into the dark part and bright part to plot.

Figure 7A:
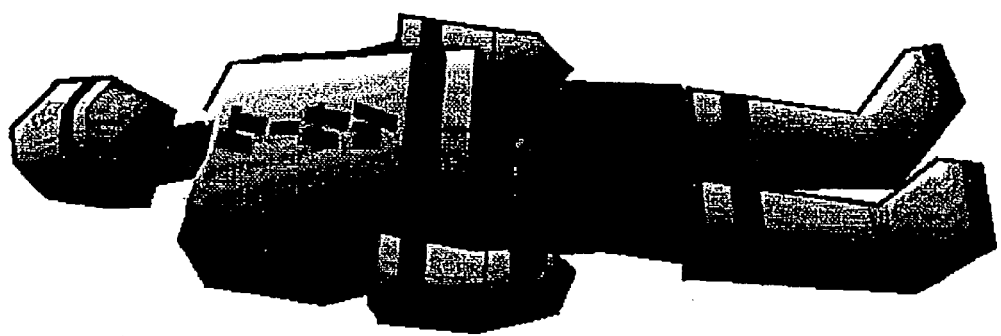
FIGS. 7A and 7B are views shown by comparing an image plotted by a method of the prior art with an image plotted by the method according to the present invention.
Figure 7B:
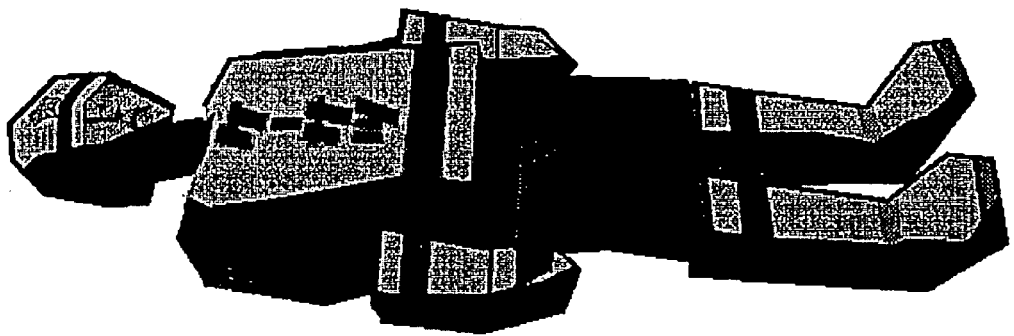

FIG. 7 is a view shown by comparing an image (FIG. 7B) plotted by a method of the prior art with an image (FIG. 7A) plotted by the method according to the present invention. As is apparent from this drawing, in the present invention, as the plotted polygon has no tones in the texture, and the cubic sense is not overemphasized, it is possible to plot without injuring the atmosphere as the animation picture.

Incidentally, as the polygon in the above description, the triangular polygon having the three apexes was explained as an example, but adaptability of the present invention is not limited to such the case.

As explained in the embodiments of the present invention, in the image processing apparatus such as the gate unit, or the like for plotting the model by the plurality of polygons by the generic computer graphic process according to the present invention, it is possible to form the animation image in real time.

What is claimed is:

1. A method of forming a polygon image, comprising the steps of:
   obtaining a plurality of polygons having normal line data as apex data and constituting a model;
   sorting the plurality of polygons into polygons of a first color part and polygons of a second color part along a boundary line between said first and second color parts, according to the direction of a light source and normal lines of the plurality of polygons;
   dividing polygons intersecting the boundary line along the boundary line;

sorting the divided polygons into polygons of the first color part and polygons of the second color part along the boundary line according to the direction of a light source and normal lines of the divided polygons; and pasting up the first mono-color texture on the polygons belonging to the first color part, and the second mono-color texture on the polygons belonging to the second color part.

2. A method of forming a polygon image comprising the steps of:

obtaining a plurality of polygons having normal line data as apex data and constituting a model;

sorting the plurality of polygons into polygons of a first color part and polygons of a second color part along a boundary line according to the direction of a light source and normal lines of the plurality of polygons;

dividing polygons intersecting the boundary line along the boundary line;

sorting the divided polygons into polygons of the first color part and polygons of the second color part along the boundary line according to the direction of a light source and normal lines of the divided polygons;

pasting up the first mono-color texture on the polygons belonging to the first color part, and the second mono-color texture on the polygons belonging to the second color part; and acquiring inner product values of the direction of a light source and normal lines of the divided polygons, wherein the polygons intersecting the boundary line are determined as polygons having different polarities of the acquired inner product values;

wherein intersectional position of a side line of a polygon intersecting the boundary line is acquired from a proportional relation with the inner product values of two apexes of the side line of the polygon intersecting the boundary lines when the inner product value is at the intersectional position is set "0".

3. An image processing apparatus comprising:

control means for obtaining a plurality of polygons having normal lines as apex data and constituting a model, sorting the plurality of polygons into polygons of a first color part and polygons of a second color part along a boundary line between said first and second color parts, according to the direction of a light source and normal lines of the divided polygons, dividing polygons intersecting the boundary line along the boundary line, and sorting the divided polygons into polygons of the first color part and polygons of the second color part along the boundary line according to the direction of a light source and normal lines of the divided polygons; and a rendering processor for pasting up the first mono-color texture on the polygons belonging to the first color, part and the second mono-color texture on the polygons belonging to the second color part.

4. The image processing apparatus comprising:

control means for obtaining a plurality of polygons having normal lines as apex data and constituting a model, sorting the plurality of polygons into polygons of a first color part and polygons of a second color part along a boundary line according to the direction of a light source and normal lines of the divided polygons, dividing polygons intersecting the boundary line along the boundary line, and sorting the divided polygons into polygons of the first color part and polygons of the second color part along the boundary line according to the direction of a light source and normal lines of the divided polygons; and a rendering processor for pasting up the first mono-color texture on the polygons belonging to the first color, part and the second mono-color texture on the polygons belonging to the second color part;

wherein the control means acquires inner product values of the direction of a light source and normal lines of the divided polygon, wherein the polygons intersecting the boundary line are determined as polygons having different polarities of the acquired inner product values; and intersectional position of a side line of a polygon intersecting the boundary line is acquired from a proportional relation with the inner product values of two apexes of the side line of the polygon when the inner product at the intersectional position is set "0".

5. A record medium storing a program which is executed by control means in an image processing apparatus, the program providing a control which comprises the steps of:

obtaining a plurality of polygons having normal lines as apex data and constituting a model;

sorting the plurality of polygons into polygons of a first color part and polygons of a second color part along a boundary line between said first and second color parts, according to the direction of a light source and normal lines of the plurality of polygons;

dividing polygons intersecting the boundary line along the boundary line;

sorting the divided polygons into polygons of the first color part and polygons of the second color part along the boundary line according to the direction of a light source and normal lines of the divided polygons; and pasting up the first mono-color texture on the polygons belonging to the first color part and the second mono-color texture on the polygons belonging to the second color part.

6. A record medium having stored therein the program which is executed by control means in an image processing apparatus, the program providing a control which comprises the steps of:

obtaining a plurality of polygons having normal lines as apex data and constituting a model;

sorting the plurality of polygons into polygons of a first color part and polygons of a second color part along a boundary line according to the direction of a light source and normal lines of the plurality of polygons;

dividing polygons intersecting the boundary line along the boundary line;

sorting the divided polygons into polygons of the first color part and polygons of the second color part along the boundary line according to the direction of a light source and normal lines of the divided polygons; and pasting up the first mono-color texture on the polygons belonging to the first color part and the second mono-color texture on the polygons belonging to the second color part;

wherein the control provided by the program stored in the record medium further comprises the step of acquiring inner product values of the direction of a light source and normal lines of the divided polygons, and wherein the polygons intersecting the boundary line are determined as polygons having different polarities of the acquired inner product values;

wherein intersectional position of a side of a polygon intersecting the boundary line is acquired from a proportional relation with the inner product values of two apexes of side line of the polygon when the inner product value at the intersectional position is set "0".

7. The method of forming a polygon image according to claim 1, further comprising the step of acquiring inner product values of the direction of a light source and normal lines of the divided polygons, wherein the polygons intersecting the boundary line are determined as polygons having different polarities of the acquired inner product values.

8. The imaging processing apparatus according to claim 3, wherein the control means acquires inner product values of the direction of a light source and normal lines of the divided polygon, wherein the polygons intersecting the boundary line are determined as polygons having different polarities of the acquired inner product values.

9. The record medium according to claim 5, wherein the control provided by the program stored in the record medium further comprises the step of acquiring inner product values of the direction of a light source and normal lines of the divided polygons, and wherein the polygons intersecting the boundary line are determined as polygons having different polarities of the acquired inner product values.

* * * * *